United States Patent [19]
Bleickardt et al.

[11] 3,872,257
[45] Mar. 18, 1975

[54] MULTIPLEX AND DEMULTIPLEX APPARATUS FOR DIGITAL-TYPE SIGNALS

[75] Inventors: Werner Heinrich Bleickardt; Richard Barker Robrock, II, both of Middletown, N.J.

[73] Assignee: Bell Telephone Laboratories, Incorporated, Murray Hill, Berkeley Heights, N.J.

[22] Filed: Mar. 11, 1974

[21] Appl. No.: 450,203

[52] U.S. Cl.......... 179/15 BS, 179/15 A, 179/15 BY
[51] Int. Cl............................................... H04j 3/06
[58] Field of Search.......... 179/15 A, 15 BS, 15 BY; 325/4

[56] References Cited

UNITED STATES PATENTS

| | | | |
|---|---|---|---|
| 3,207,851 | 9/1965 | Fukinuki | 179/15 BY |
| 3,359,373 | 12/1967 | Anderson | 179/15 BY |
| 3,549,814 | 12/1970 | Jaeger | 179/15 BY |
| 3,569,631 | 3/1971 | Johannes | 179/15 BY |
| 3,689,699 | 9/1972 | Brenig | 179/15 BS |

*Primary Examiner*—David L. Stewart
*Attorney, Agent, or Firm*—Daniel D. Dubosky

[57] ABSTRACT

A plurality of digital data streams are combined into a single bit stream by a multiplexer apparatus in which a first multiplexer circuit combines bits from odd-numbered channels into a frame interval which begins with a first type terminal control bit and has a second type terminal control bit midway in the frame. A second multiplexer circuit combines the bits from the even-numbered channels into a frame interval which begins with a complement of the first type terminal control bit and has the second type terminal control bit positioned at a location midway within the frame. The outputs of both multiplexer circuits are scrambled in order to improve the signal statistics and are interleaved in a simple gated OR circuit in order to provide a bit stream having a bit rate which is twice the rate at which either of the multiplexer circuits is operated. In response to a timing control circuit, the first type terminal control bit is positioned in a digit space adjacent to its complement and the two second type terminal control bits are positioned in adjacent digit spaces within the output bit stream. As a result, framing is achieved entirely by the terminal control bits with no assistance from framing bits, and the multiplex circuits operate at a rate equal to approximately one-half the output bit rate. The terminal control bits are utilized primarily to provide stuffing and parity information.

15 Claims, 4 Drawing Figures

MULTIPLEX AND DEMULTIPLEX APPARATUS FOR DIGITAL-TYPE SIGNALS

FIELD OF THE INVENTION

This invention relates to pulse-type communication systems and, more particularly, to time division multiplex pulse code modulation systems for utilization in combining a plurality of digital data streams into a single high-speed output bit stream.

BACKGROUND OF THE INVENTION

To provide a digital data stream for the digital transmission system known in the industry as the T1 Carrier System, 24 voice frequency channels are converted into a digital format and combined in a D-type channel bank to produce a bit stream having a rate equal to 1.544 megabits per second. In order to insure that the original information which has been encoded by the D-type channel bank may be recovered at a receiving location, framing must be maintained at both ends of the T1 Carrier System between the multiplexer and demultiplexer apparatus. The bits produced by the channel bank apparatus are transmitted in sequential groups with one group from each of the input channels. To achieve framing, the beginning of a new frame is marked by digital spaces designated as framing spaces which are caused to alternate between "0" and "1" from one frame to the next adjacent frame. Detection of this alternating "1" - "0" pattern in the demultiplexer permits this apparatus to allocate properly each one of the digital bits within the bit stream to its proper output channel. A framing sequence of the type described is shown in U.S. Pat. No. 3,359,373 of Dec. 19, 1967 to E. J. Anderson et al.

With the advent of digital transmission systems of a higher order, the transmission of a plurality of bit streams of the T1 Carrier System type over a single facility became possible. 28 bit streams of the type designated for use in the T1 carrier are combined in an M13 Digital Multiplex in order to produce a bit stream having a transmission rate of about 45 megabits per second. Here again, framing must be maintained between the transmitting and receiving locations in order to recover the information which is present in each one of the input bit streams. To achieve this end, an alternating "1" - "0" pattern of the type utilized in the D-type channel bank is also utilized in the M13 Digital Multiplex. As appreciated by those skilled in the art, this type of framing pattern requires that the framing bits be interleaved with the bits from the input bit stream. As a result, the multiplexer apparatus is generally required to operate at the same rate at which the bits will appear in the output bit stream.

Other types of framing which do not utilize framing bits are known to those skilled in the art. One type is illustrated in the 100 megabits per second system described in the article entitled "Experimental 100 Mb/s PCM Terminals," by Shoji Kondo and Kiyohiro Yuki, *Review of the Electrical Communication Laboratories*, Volume 21, Numbers 5–6, May-June 1973, pages 276 through 284. In this 100 megabit per second system, each frame begins with a housekeeping digital word followed by three groups of stuffing control bits. As is well known to those skilled in the art, the stuffing control bits are utilized to synchronize the asynchronous digital inputs to the output bit stream. In this type of framing format, it is not necessary to provide separate framing pulses because the large number of stuffing control bits can be utilized for framing. As pointed out in the article entitled "Experimental Multiplexing Equipments for High Speed PCM Systems — 100 M, 400 M, 800 M System," by S. Hinoshita, M. Sakai and Y. Fujisaki, *FUJITSU Scientific & Technical Journal*, September 1973, pages 65 through 83, this type of framing format has a disadvantage in that a large capacity synchronizing buffer memory is required for the stuffing control bits in order to establish framing. To improve upon this framing format, the Hinoshita et al. article suggests the establishment of a frame in which the stuffing controls bits and housekeeping bits are distributed more or less uniformly with framing bits throughout the entire frame interval. Here again, however, as in the case of the alternating "0" - "1" framing format utilized in connection with the T1 carrier bit stream, framing bits must be interleaved with the input data bits in order to achieve framing and this type of interleaving requires that the multiplexer operate at a rate equivalent to the bit rate of the output bit stream.

The forthcoming coaxial line system designated as T4M in the Bell System (and other systems designated as WT4 and DR-18) will have the capacity to transmit a bit stream having a rate in excess of 200 megabits per second. To fully utilize this type of high capacity digital transmission system, it is required that a plurality of 45 megabits per second bit streams from the outputs of the several M13 Digital Multiplexers be multiplexed into a single bit stream. At this bit rate, interleaving and alternating a "1" - "0" pattern for the purpose of achieving framing have been found to be extremely difficult. In addition, simple utilization of a large scale housekeeping control word at the beginning of each frame interval is extremely inefficient in the utilization of the high speed system.

SUMMARY OF THE INVENTION

A primary object of the present invention is to frame a high speed bit stream without the utilization of framing bits which must be interleaved at the high frequency bit rate. Another object of the present invention is to perform as many of the multiplexing operations as possible at rates which are lower than the high frequency output bit rate. Still another object of the present invention is to utilize the bits in the high speed output bit stream in as efficient a manner as possible by utilizing as few bits as possible for housekeeping purposes.

These objects and others are achieved in accordance with the present invention, wherein the digital data from a plurality of input digital data streams is combined into a single output bit stream having a frame interval which consists of at least two subframe intervals, each one of which includes bits from each of the input channels and, in addition, is headed by at least two bits containing terminal control information. The first subframe interval is headed by a pair of complementary terminal control bits of a first type and the second subframe interval is headed by a pair of equal terminal control bits of a second type. The simple coupling of the two pairs of terminal control bits through a comparator circuit or an EXCLUSIVE OR gate provides the demultiplexer with an alternating "1" - "0" pattern for framing purposes. In addition, the duplication of terminal control bits provides additional information to the demultiplexer and also provides increased resistance to malfunction caused by errors.

This advantageous framing format is achieved in an embodiment in which one-half of the input digital data streams are combined in a first multiplexer circuit which produces sequential groups of bits at its output, each one of which is headed by a bit corresponding to a terminal control bit of the first type. A terminal control bit of a second type is positioned by the first multiplexer circuit at a point substantially midway in each group of digital bits. The second half of the input digital data streams is combined in a second multiplexer circuit which also produces a sequence of digital groups at its output. The head of each digital group at the output of the second multiplexer circuit is a bit corresponding to the complement of the terminal control bit of the first type, and the terminal control bit of the second type is positioned at a point substantially midway in the digital group. The digital groups from each of the multiplexer circuits are combined in a gated OR circuit to provide the high speed output bit stream. Timing of the multiplexer circuits is maintained such that the resulting frame interval in the output bit stream is headed by a pair of complementary terminal control bits of the first type and includes a pair of equal terminal control bits of the second type at a point substantially midway in the frame interval.

The invention will be more readily appreciated by those skilled in the art after reading the following detailed description in combination with the drawing, in which.

DETAILED DESCRIPTION

Figure 1:
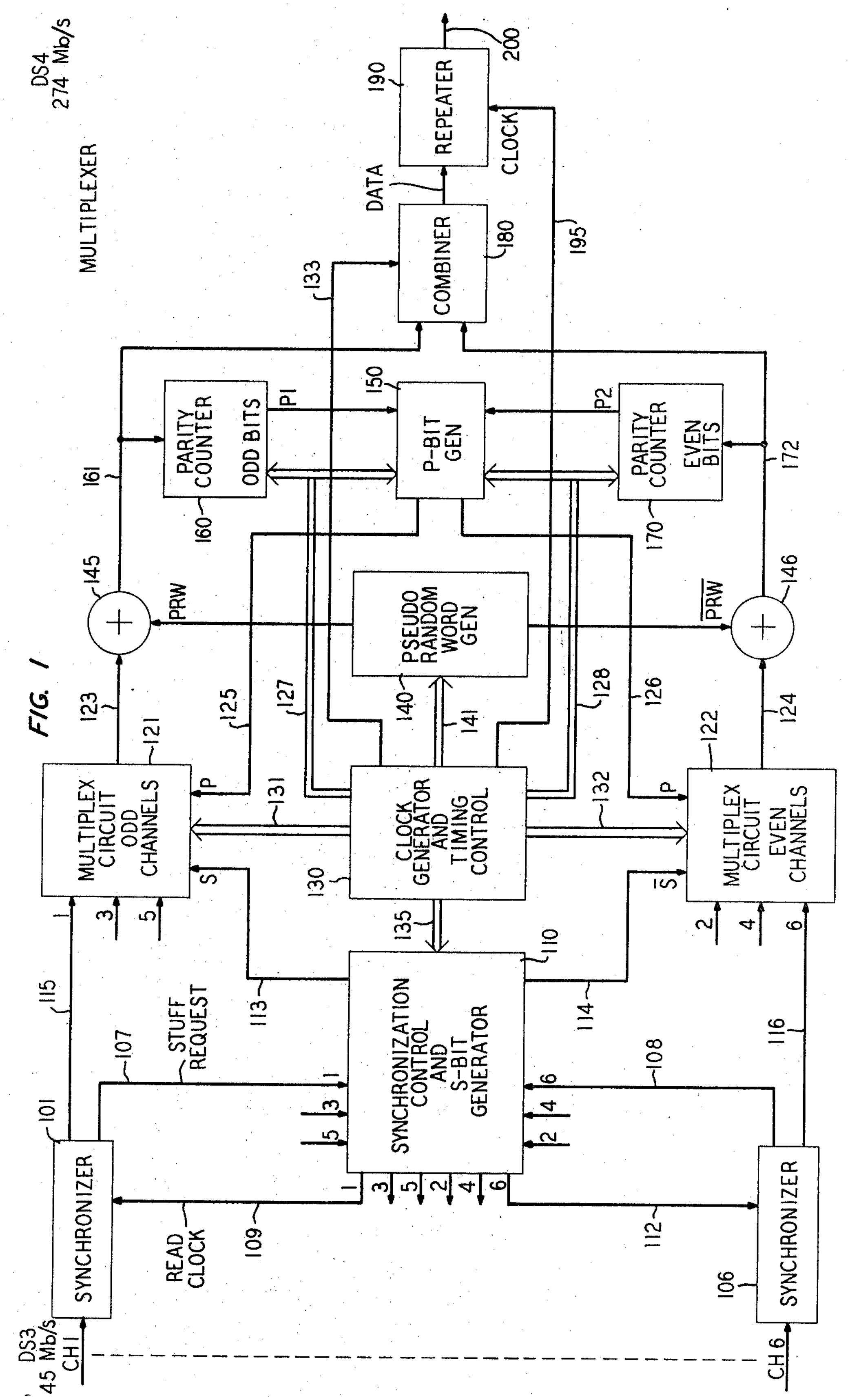
FIG. 1 is a schematic block diagram of a multiplexer constructed in accordance with the present invention.

The multiplexer which utilizes the present invention is shown in schematic block diagram form in FIG. 1 of the drawing. It is the function of this multiplexer to combine the digital data streams from six input channels into a single high speed bit stream on a transmission channel 200. As indicated in FIG. 1, the bit streams which are coupled to the inputs of this multiplexer apparatus have a bit rate of about 45 megabits per second. This type of bit stream is available at the output of a multiplexer apparatus known in the Bell System as the M13 Digital Multiplex. As pointed out hereinabove, this multiplexer apparatus produces this bit stream by combining 28 bit streams of the type transmitted in the T1 Carrier System. It is to be understood, however, that the present invention may be utilized to combine any other plurality of high speed digital data streams into a single high speed bit stream.

Since the bit streams provided at the inputs of the multiplexer in FIG. 1 are asynchronous, they must be synchronized in some manner to interleave them into a single bit stream. In the present embodiment this synchronization is accomplished through utilization of the technique well known in the art as "stuffing". Briefly, the higher speed output bit stream on transmission channel 200 is caused to have a rate which is greater than the data which must be transmitted from all six input channels plus the information required for synchronization and housekeeping purposes. With this type of relationship, there are in essence extra bit spaces available in the higher speed output bit stream.

Each input bit stream is coupled to the input of a synchronizer apparatus. In FIG. 1 only the synchronizers for channels 1 and 6 are illustrated in order to preserve clarity in the drawing. It is to be understood, however, that all six channels have synchronizer apparatus. Each synchronizer includes a buffer memory which stores the bits from the input channel. This buffer memory is read out in response to an energizing pulse at the read input of the synchronizer. For example, in the case of channel 1 an energizing pulse on line 109 causes the oldest bit in synchronizer 101 to be coupled onto line 115, the output of synchronizer 101. In addition, each synchronizer has apparatus for determining the level of fullness of its buffer memory. When the number of bits stored in the buffer memory drops below a predetermined threshold level, an energizing signal is developed at the stuff request output of the synchronizer. In the case of synchronizer 101, this energizing would appear on line 107. The presence of this signal is utilized to indicate that the number of bits stored in the corresponding synchronizer has dropped below the predetermined threshold level and, therefore, a read clock pulse should be skipped, and a stuffing bit should be inserted by the multiplexer in place of the data pulse in order to free that synchronizer for a single time slot, thereby enabling the input bit stream to replenish the buffer memory. This technique of synchronizing asynchronous input bit streams is well known in the art. See, for example, the article entitled "A 1.5 to 6 Megabit Digital Multiplex Employing Pulse Stuffing" by R. A. Bruce, *Conference Record, IEEE International Conference on Communications*, June 9–11, 1969, pages 34-1 through 34-7. See, also, U.S. Pat. No. 3,042,751 of July 3, 1962 to R. S. Graham and U.S. Pat. No. 3,136,861 of June 9, 1964 to J. S. Mayo.

The data outputs from the synchronizers corresponding to channels 1, 3 and 5 are coupled to corresponding inputs of a multiplex circuit 121. This multiplex circuit 121 also includes a S (synchronization) bit input on line 113 and a P (parity) bit input on line 125. Multiplex circuit 121 operates in response to the timing signals provided to it on but 131 from a clock generator and timing control circuit 130. Briefly, multiplex circuit 121 connects one of the five inputs described hereinabove to an output line 123 at intervals which are determined by the timing signals provided to it from timing control circuit 130. Multiplex circuit 121 is constructed of a plurality of gates which operate in response to both a data pulse and to a pulse provided from the timing control circuit 130 in order to interleave the signals provided from channels 1, 3 and 5 and on lines 113 and 125 into a single output bit stream on line 123. The connection provided by multiplex circuit 121 is maintained in synchronism with the energizing pulses provided to the read clock inputs of the synchronizers such that the synchronizer for channel 1 is caused to be reading out a data bit at the same instant when multiplex circuit 121 connects the channel 1 input through to line 123. In an identical fashion but during different instants, multiplex circuit 122 interleaves the data bits from channels 2, 4 and 6 with the information on lines 114 and 126 into a single bit stream on line 124. Multiplex circuit 122 is also driven by the clock generator and timing control circuit 130 by way of timing signal information provided to it on bus 132. Here again, the timing signals on bus 132 are caused to be in synchronism with the read energizing pulses provided to the synchronizers corresponding to channels 2, 4 and 6.

Figure 3:
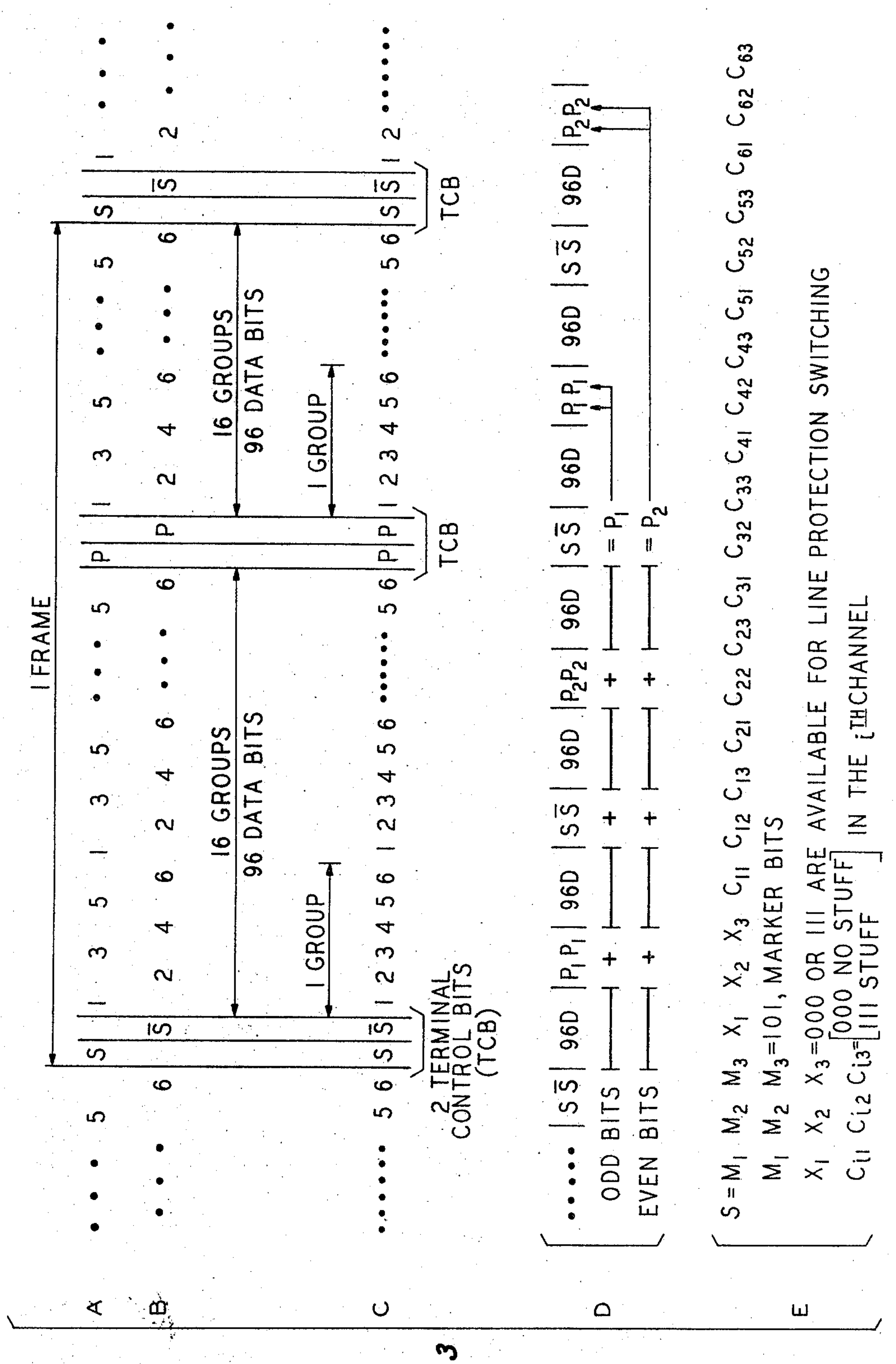
FIGS. 3 and 4 include several bit stream patterns useful in describing the operation of the present invention.

The synchronization of both multiplex circuit 121 and multiplex circuit 122 is achieved by the timing control circuit 130 through the timing signals provided by way of buses 131, 132 and 135. The working interrelationship between both multiplex circuit 121 and multiplex circuit 122 with the timing control circuit 130 and synchronization control circuit 110 can best be described by referring to the bit stream formats illustrated in FIG. 3 of the drawing. The letter and number sequence designated as line A in FIG. 3 represents the bits which are produced by multiplex circuit 121 on line 123. The letter and number sequence designated as line B in FIG. 3 represents a similar output on line 124 at the output of multiplex circuit 122. Each frame is designated in lines A and B of FIG. 3 as beginning with the S bit. During this instant, timing control circuit 130 causes multiplex circuit 121 to connect the S bit on line 113 through to output line 123. During the next pulse interval, timing control circuit 130 causes multiplex circuit 122 to connect the complement of the S bit which is available on line 114 through to its output line 124. The clock generator within timing control circuit 130 operates at a rate equal to the bit rate developed on the output transmission channel 200. Divider circuits within the timing control circuit 130 provide clock pulse streams of one-half the rate and lower. These one-half rate and lower rate clock pulse streams are utilized to drive multiplex circuits 121 and 122 at a rate equal to one-half the rate of the bit streams on the output transmission channel.

As indicated in line A of FIG. 3, multiplex circuit 121 is then caused by the timing control circuit 130 to sample the data pulse on line 115 from synchronizer 101. This corresponds to the data bit available from channel 1 and therefore a "1" is indicated to follow the S bit in line A of FIG. 3. A predetermined number of time slots earlier, the timing signals provided by way of bus 135 from timing control circuit 130 caused the synchronization control circuit 110 to provide an energizing pulse by way of line 109 to the read clock input of synchronizer 101. In this way, a multiplex circuit is maintained in synchronism with the readout of data bits from the correct synchronizer circuit. The data bits from channels 3 and 5 are read out during instants following the readout of synchronizer 101 and the repetition of reading channels 1, 3 and 5 continues for an interval sufficient to read out each of these odd-numbered channels 16 times. Hence, 16 groups of data bits from channels 1, 3 and 5 are caused to follow the development of an S bit on line 123. At this point, timing control circuit 130 causes multiplex circuit 121 to connect line 125 containing the P bit through to output line 123.

In an identical fashion, multiplex circuit 122 is driven by the timing signals on bus 132 to produce the bit stream illustrated in line B of FIG. 3 wherein the complement of the S bit is followed by 16 groups of data bits from channels 2, 4 and 6, in turn followed by the P bit from line 126. As will be pointed out hereinafter, the P bit on line 126 is identical to the P bit provided on line 125. This relationship is unlike the S bits provided to each of the multiplex circuits inasmuch as the S bit on line 114 is the complement of the S bit on line 113. The P bits developed at the output of each multiplex circuit are followed by sixteen groups of data bits from the appropriate input channels. Hence, the entire frame developed by the multiplex circuits consists of 32 groups of data bits from each of their corresponding input channels headed by an S or $\bar{S}$ bit with a P bit situated after 16 groups of data bits.

The information provided on lines 113 and 114 designated as the S bit and the complement of the S bit, respectively, can be better described in connection with the bit stream indicated in FIG. 4 to be discussed hereinafter. Briefly, the S bit over a period equivalent to 24 frames establishes a word which provides primarily the stuffing information. In addition, this word provides information which may be utilized for signaling purposes and also provides marker information for synchronizing this word which occurs over an interval of twenty-four frames, designated hereinafter as a superframe. The P bit information provided on lines 125 and 126 is also a low frequency signal but in this case the P bit relates only to parity check information.

The bit stream on line 123 from the output of multiplex circuit 121 is connected to one input of a modulo 2 adder 145. A second input of modulo 2 adder 145 is connected to receive one output of a pseudo random word generator 140. This generator 140 is driven by the energizing pulses provided to it by way of bus 141 from the timing control circuit 130. Briefly, pseudo random word generator 140 provides a digital output to modulo 2 adder 145 at each of the bit intervals corresponding to data bits which are derived from the input channels. As a result, the data bits provided at the output of modulo 2 adder 145 on line 161 are scrambled by the pseudo random word generator 140, thereby resulting in improved signal statistics from the standpoint of providing better dc balance and timing to the regenerators in the high speed digital transmission line. During the intervals when the S bit and the P bit are present on line 123, the output of pseudo random word generator 140 is inhibited by the timing signals provided on bus 141, thereby causing the S and P bits to be unaltered by the pseudo random word generator 140. As a result, the frame can be found in the demultiplexer without descrambling.

In a similar fashion, pseudo random word generator 140 provides a complementary pseudo random word to one input of a modulo 2 adder 146, a second input of which is connected to receive the data bit stream produced by multiplex circuit 122. Here again, the pseudo random word generator is permitted to scramble only the data bits which have been derived from the input channels. The $\bar{S}$ and P bits are caused to be passed unchanged through the modulo 2 adder 146.

Pseudo random word generator 140 is a maximum length feedback shift register with seven stages producing a cycle of ($2^7-1=$) 127 bits long. A shift register of this type is well known to those skilled in the art. See, for example, Chapter IV of *Shift Register Sequences*, by S. W. Golomb, Holden-Day, Inc., 1967. Pseudo random word generator 140 is operted at half the bit rate of the digital bit stream on transmission channel 200, that is, at about 137 megahertz, and it steps through its cycle without any interruptions at the terminal control bit or stuffing locations. As pointed out hereinabove, however, the outputs of generator 140 are inhibited during the S and P bit intervals. Synchronization of the word generators at both ends of the transmission channel is achieved by resetting them in a manner to be described hereinafter in connection with the discussion of the information contained in the S bit.

The bit stream on line 161 at the output of modulo 2 adder 145 and the bit stream present on line 172 at the output of modulo 2 adder 146 are combined in a combiner circuit 180 to produce a single bit stream at the input of a repeater 190. Energizing pulses from the clock generator and timing control circuit 130 are coupled by way of line 133 to a clock input of combiner 180. In response to each energizing pulse, the combiner circuit 180 simply changes the connection of its output circuit from one input to the other. In this way, combiner circuit 180 interleaves the bits on lines 161 and 172 into a single bit stream having a bit rate equal to the clock generator within timing control circuit 130. This bit stream is indicated in the line designated as C in FIG. 3. Repeater 190 is driven by clock pulses from the clock generator within timing control circuit 130 and couples the digital data at its input to the high speed transmission channel 200. Repeater 190 is present simply to provide a regeneration and amplification of the information bits present at the output of the multiplexer.

As indicated in line C of FIG. 3, each complete frame of digital data is headed by a pair of complementary terminal control bits, followed by 16 groups of data bits from the six input channels, followed by a pair of equal terminal control bits, and ending with 16 groups of data bits from the input channels. This advantageous utilization of a complementary pair of terminal control bits in combination with an equal pair of terminal control bits within the frame interval provides all of the framing information which is necessary to establish the frame intervals in the demultiplexer. No additional framing bits are necessary. Simply coupling the complementary pair of terminal control bits and the equal pair of terminal control bits through either an EXCLUSIVE OR circuit or a comparator circuit provides the demultiplexer with an alternating "1" - "0" pattern of the type frequently utilized in prior art demultiplexers for the purpose of framing. It should be readily apparent to those skilled in the art that either the S bit or the P bit can be utilized to provide the complementary pair. In other words, the S bit and P bit may be interchanged in the framing interval without departing from the spirit and scope of the present invention. In addition, the frame interval may be headed by the equal pair of terminal control bits and the complementary pair may be positioned within the drame interval.

As indicated hereinabove, the P bit contains information relating to parity. The P bit is generated in a P bit generator 150 which derives its information from a parity counter 160 and a parity counter 170. All three units, generator 150 and counters 160 and 170, are driven by the timing signals from the clock and timing control circuit 130 in a manner which can best be described by referring to line D of FIG. 3. In a manner to be described hereinafter in connection with the S bit, both the multiplexer and the demultiplexer can always locate the beginning of the 16 groups of digital data that precede the P1 bit in a 24 frame interval designated herein as a superframe. Briefly, a first parity P1 is taken over all of the data bits from the odd-numbered channels within two successive frames starting after $\overline{S}$ and ending before the S bit. A second parity P2 is taken over all of the data bits from the even-numbered channels within the same two frames starting and ending at the same points. Hence, P1 and P2 are taken over a parity interval consisting of four groups of 48 data bits—or a total of 192 bits. P1 and P2 are both defined as even parity over their respective parity interval, that is, P1 or P2 is "0" if the number of "1s" within the corresponding 192 bits is even. If the number of "1s" within the 192 bits is odd, P1 or P2 is "1". As indicated in line D of FIG. 3, P1 is transmitted in the first P bit location after the two-frame parity interval and P2 is transmitted in the next P bit location after the two-frame parity interval. In summary, the P bit provides a low frequency information word which indicates parity for both even and odd channels over a two-frame interval.

Parity counter 160 in FIG. 1 is driven by the timing signals from the timing control circuit 130 to sum the digital "1s" on line 161 over the above-mentioned two-frame interval. During the complementary S pair following the two-frame interval, the P1 bit generated by parity counter 160 is coupled into storage within P bit generator 150. During the same complementary S pair following the two-frame interval, the P2 bit which is generated by parity counter 170 is also coupled into storage within P bit generator 150. During the first P interval following the two-frame parity interval, P bit generator 150 couples P1 by way of line 125 to multiplex circuit 121 and also couples the same identical P1 by way of line 126 to multiplex circuit 122. During the second P interval following the two-frame parity interval indicated in line D of FIG. 3, P bit generator 150 couples the P2 bit by way of lines 125 and 126 to both multiplex circuits.

The information provided by the S bit is low frequency information relating primarily to pulse stuffing. The S bit provides over the superframe interval of 24 frames a 24-bit word which may be characterized by the letters indicated in line E of FIG. 3. These 24 S bits transmitted over an interval of 24 frames may be characterized as the S word. The first three bits of the S word designated in line E of FIG. 3 as M1, M2 and M3 are always given the logical values of "1", "0" and "1", respectively. These three marker bits enable the demultiplexer to frame on the superframe of 24 frames for the purpose of extracting the digital information relating to stuffing and to parity. This framing is achieved within the demultiplexer by detecting the "101" pattern provided by the first three bits in the S word. As will be apparent hereinafter, no other "101" pattern will be present in the S word except as a result of error.

Synchronization of the pseudo random word generators in both multiplexer and demultiplexer is achieved by resetting them once per superframe to the "1111111" state a predetermined interval after the "101" marker bits. The resetting is achieved by the timing signals provided by a timing control circuit at both ends of the system.

The second group of three bits in the S word, designated as $X_1$, $X_2$ and $X_3$ in line E of FIG. 3, are either transmitted as "000" or "111" and are available for line protection switching in the T4M Carrier System. These three bits may be utilized in other digital systems for any other signaling purposes. The remaining 18 bits in the S word provide stuffing information for the six input channels. The stuffing information bits for the $i^{th}$ channel are designated in line E of FIG. 3 as $C_{i1}$, $C_{i2}$ and $C_{i3}$. Each channel can be stuffed with an extra bit only once during the superframe of 24 frames. If the $i^{th}$ channel is to be stuffed, a logical "1" is transmitted in each of the C bits corresponding to that channel. If the $i^{th}$ channel is not to be stuffed, then a logical "0" is transmitted in each of the corresponding C bit locations.

Figure 4:
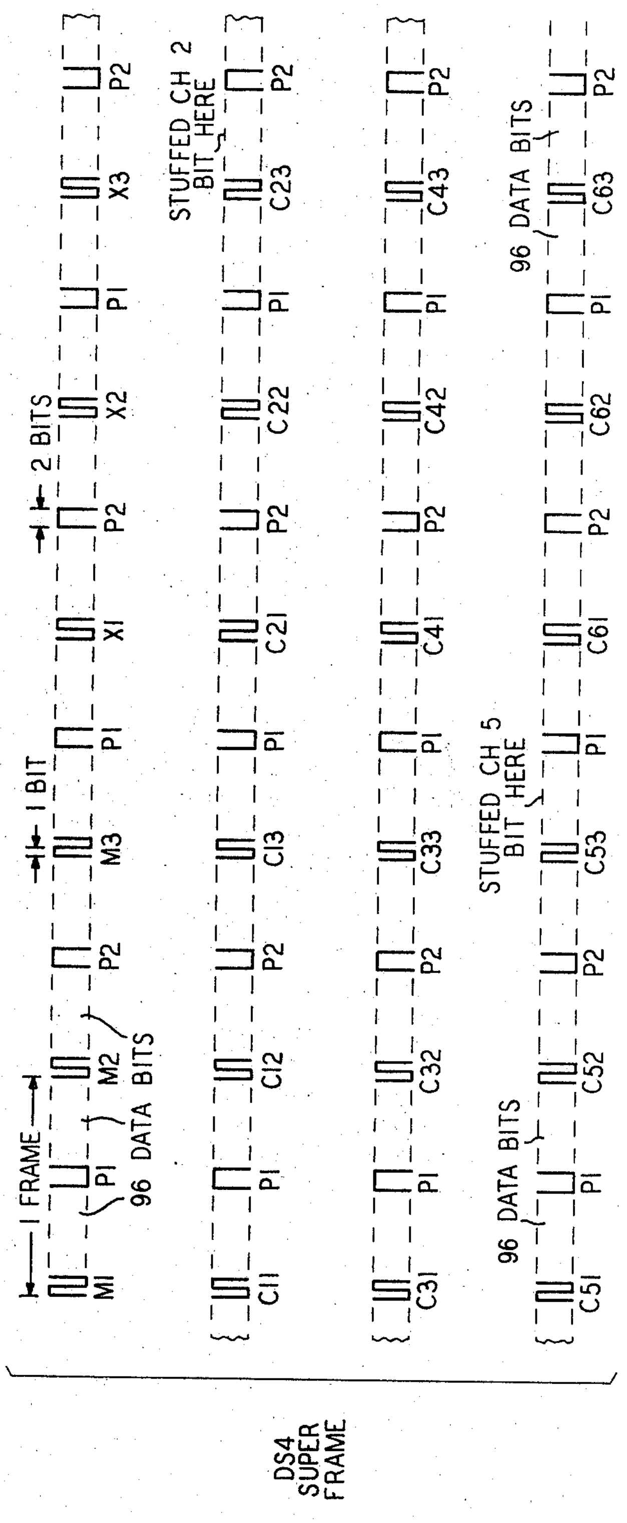

The position which each of the S bits occupies with respect to the data bits and with respect to the parity bits is illustrated in the superframe shown in FIG. 4. As indicated in this figure, each of the S bits in the superframe appears, along with its complement, at the beginning of each frame interval. In addition, an equal pair of P bits appears at a point midway in the frame interval. As indicated in FIG. 4, the P1 parity bit follows the S bit that contains the first marker bit M1 and the P2 parity bit follows the S bit that contains the second marker bit M2. In this manner, two-frame parity intervals are locked to the superframe.

The position of all of the S bits within the superframe is dictated by the clock and timing control circuit 130. During the M1, M2 and M3 bit positions, the S bit generator 110 is caused by the timing signals on bus 135 to develop a "1", "0", "1" pattern, respectively, on line 113 and a "0", "1", "0" pattern, respectively, on line 114. During the C bit locations in the S word, synchronization control and S bit generator 110 is caused by the timing signals on bus 135 to sample the stuff request from the appropriate channel and in response thereto to generate the proper stuffing signal on lines 113 and 114. In this manner, clock generator and timing control circuit 130, in cooperation with the synchronization control and S bit generator 110, establishes a 24-frame superframe and the transmission of all stuffing information.

In the bit stream format illustrated in FIG. 4, the C bits of channels 1, 3, 4 and 6 are all logical "0s" and, therefore, no stuffing is indicated in these channels. Channels 2 and 5, on the other hand, have logical "1s" in the C bit position and, therefore, stuffing was utilized in these channels. As indicated in FIG. 4, the stuffing for any channel takes place after the third C bit corresponding to that channel has been transmitted by the multiplexer. Specifically, the eighth data bit of channel $i$ after the appearance of $C_{i3}$ is stuffed whenever that channel's synchronizer has requested a stuffing. At the receiving end, the demultiplexer disregards the eighth bit of channel $i$ after the appearance of $C_{i3}$ if $C_{i1}$ , $C_{i2}$ and $C_{i3}$ are "111". This stuffing location is approximately in the middle between the terminal control bits S and P in order to minimize the peak-to-peak jitter amplitude introduced by stuffing and the presence of the control bits S and P. As pointed out hereinabove, each channel can be stuffed only once during each superframe.

Figure 2:
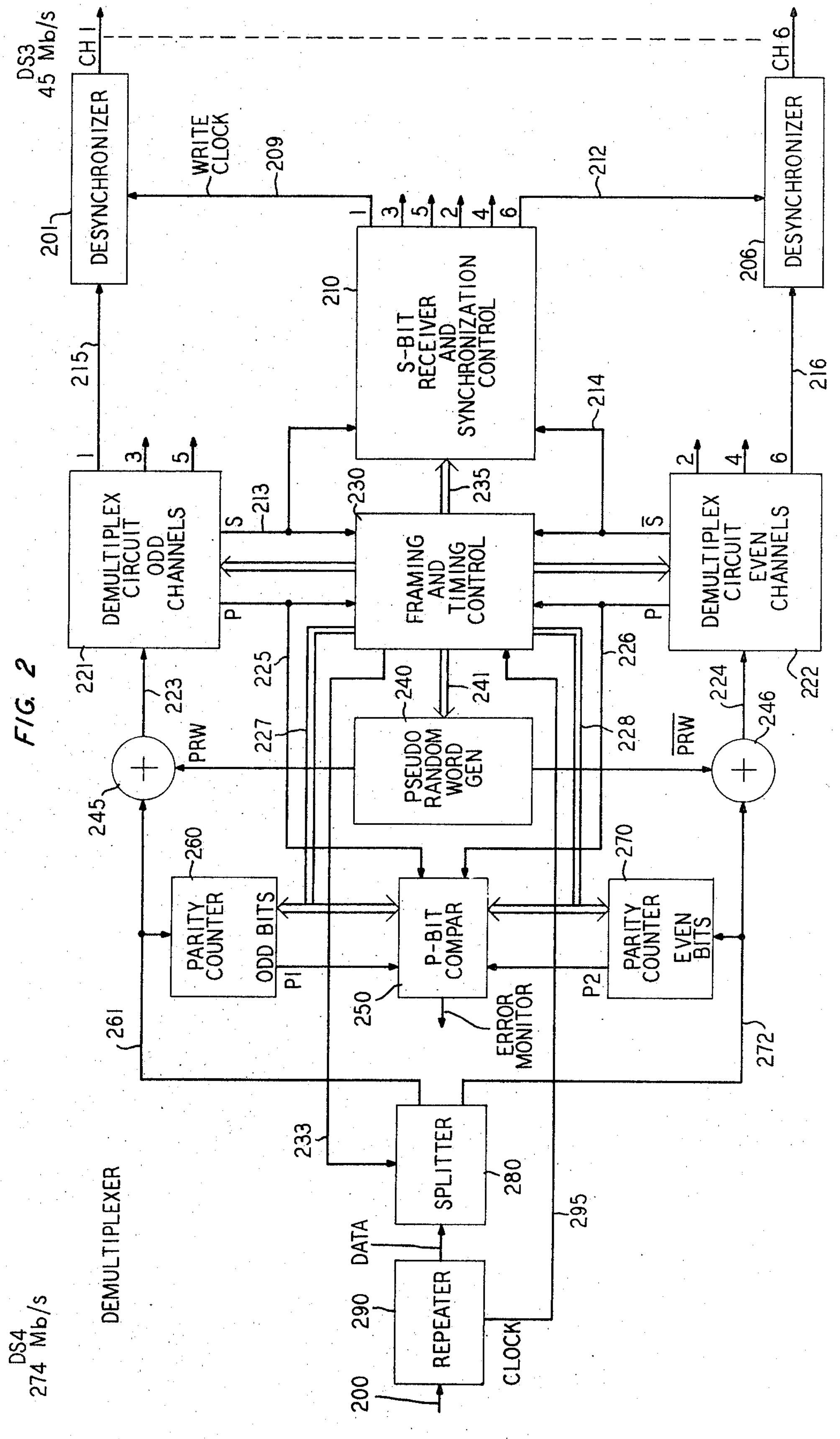
FIG. 2 is a schematic block diagram of a demultiplexer constructed in accordance with the present invention.

The demultiplexer apparatus shown in FIG. 2 performs the inverse function of the apparatus shown in FIG. 1. The high speed bit stream on transmission channel 200 is separated by the demultiplexer apparatus in FIG. 2 into six lower speed bit streams designated in FIG. 2 as channels 1 through 6. Many of the circuits utilized in FIG. 2 perform in a fashion identical to that described hereinabove for equivalent circuits in the multiplexer apparatus of FIG. 1. Accordingly, the circuits of FIG. 2 have been designated with numerals having tens and units digits equal to equivalent circuits in FIG. 1.

The high speed bit stream on transmission line 200 is coupled to the input of a repeater 290. A clocking signal is derived by repeater 290 from the bit rate on transmission channel 200 and this clocking signal is coupled by way of line 295 to a framing and timing control circuit 230. Circuit 230 performs in a manner identical to timing control circuit 130 in that it generates timing waveforms for all of the apparatus in the demultiplexer. The clocking signal on line 295 takes the place of the clock generator in timing control circuit 130.

After regeneration, the data pulses from repeater 290 are coupled to the input of a splitter circuit 280. Framing and timing control circuit 230 generates energizing pulses on line 233 having a rate equal to half the rate of the clock pulses on line 295. Unlike the clock pulses on line 295, however, these energizing pulses on line 233 are under the control of the timing control circuit 230 in a manner to be described hereinafter in connection with framing. In response to these energizing pulses on line 233, splitter circuit 280 alternately connects its input to its two outputs and thereby distributes the bits from repeater 290 in an alternating fashion between lines 261 and 272. As a result, a bit stream of every other bit and having one-half the rate of the bit stream on transmission channel 200 is produced on line 261, and a second bit stream having the same rate but with the in-between bits is produced on line 272. After framing is obtained, the bits on line 261 will be those which have been derived from the odd-numbered channels, and the bits on line 272 will be those which have been derived from the even-numbered channels.

The bit stream on line 261 is coupled to the input of a modulo 2 adder circuit 245. This circuit, in combination with pseudo random word generator 240, descrambles the bit stream on line 261. In a similar fashion, modulo 2 adder circuit 246 descrambles the bit stream on line 272. The descrambled bit streams on lines 223 and 224 are then acted upon by the demultiplex circuits 221 and 222, respectively, in order to distribute the information bits to the output terminals of the demultiplex circuits. Both demultiplex circuits operate in response to the timing signals providing by the framing and timing control circuit 230.

As pointed out hereinabove, the S and P bits of the bit stream are not scrambled in order to permit framing which is independent of the descrambling operation. To achieve this end, framing and timing control circuit 230 inhibits the output of pseudo random word generator 240 to both of the modulo 2 circuits during those intervals when the S and P bits are present in the digital bit stream. Initially, of course, the framing and timing control circuit may be in error in its choice of the bit positions which correspond to the S and P bits. Framing and timing control circuit 230, however, has the bits which are selected as S and P bits available to it by way of lines 213, 214, 225 and 226 at the outputs of the demultiplex circuits 221 and 222.

The bit on line 213 and the bit on line 214 are coupled to the inputs of an EXCLUSIVE OR circuit within the framing and timing control circuit 230. The bits of lines 225 and 226 are also coupled to the inputs of a second EXCLUSIVE OR circuit within the timing control circuit 230. If the framing and timing control circuit 230 has selected the correct bit positions for the S and P bits, these two EXCLUSIVE OR circuits will provide an alternating "1" or "0" pattern, indicating that framing has been achieved. If this alternating "1" and "0" pattern is not present, framing and timing control circuit 230 causes splitter circuit 280 to slip its distribution of bits by one position. This slipping of bit positions continues until an alternating "1" and "0" pattern is achieved from the complementary pair of S bits and the identical pair of P bits within framing and timing control circuit 230.

The P bits on lines 225 and 226 are also coupled to the inputs of a P bit comparator 250. Third and fourth inputs of P bit comparator 250 are connected to receive the outputs from parity counter 260 and parity counter 270. P bit comparator 250 compares the parity bits which have been transmitted and are available on lines 225 and 226 with the parity bits that have been developepd by parity counters 260 and 270. In this way, P bit comparator 250 is able to determine when an error has been introduced into the digital bit stream, since this error will result in a disagreement between the transmitted and developed parity bits. Inasmuch as parity bits are transmitted in the present system for both even and odd channels, the present system is capable of detecting single errors or double errors occurring either in adjacent bits or in bits that are separated by an even number of bits.

After framing is established, framing and timing control circuit 230 searches for the "101" pattern in the S bits provided to it by way of lines 213 and 214 in order to determine the beginning of the above-mentioned superframe. After detection of this "101" pattern equivalent to the M bits within the S word, framing and timing control circuit 230 signals by way of bus 235 and S-bit receiver and synchronization control circuit 210 to pick out the stuffing information from the S bits provided to it on lines 213 and 214. In addition, framing and timing control circuit 230 couples timing signals by way of buses 227 and 228 to the P-bit comparator circuit 250 to insure that the P1 bit from parity counter 260 is compared with the P bits on lines 225 and 226 during the P-bit interval immediately following the first digital "1" in the "101" marker bit pattern. The P2 bit is compared during the P-bit interval following the digital "0" in the marker bits.

As pointed out hereinabove and illustrated in FIG. 4, the detection of digital "1s" in the stuffing control bit positions for any given channel indicates that that channel has been stuffed. Inasmuch as S and $\bar{S}$ provide a total of six stuffing control bits for each channel, the decision as to whether or not stuffing has occurred can be made on a three-out-of-five basis. Hence, two-bit error correction can be achieved. In response to three digital "1s", the energizing pulse provided by synchronization control circuit 210 to the desynchronizer corresponding to that channel is inhibited during the eighth bit position following the last C bit which contains the stuffing information. In this way, the stuffed data bit which was added for the purpose of synchronizing an input bit stream to the multiplexer apparatus is removed from the output bit stream developed by the desynchronizer within the demultiplexer of FIG. 2.

The low speed data bit streams designated as channels 1 through 6 in FIG. 2 are then available for transmission to additional demultiplexer apparatus, for example, the above-mentioned M13 Digital Multiplex in the Bell System. As indicated hereinabove, these bit streams may than be further demultiplexed in order to provide the initial low frequency information.

As will be apparent to those skilled in the art, only the framing on the complementary pair of S bits and the equal pair of P bits is required in order to establish the correct digital bits at channel outputs of the demultiplex circuits. Synchronization relates to pulse stuffing for the purpose of establishing bit rates for the input bit streams which may be readily interleaved into a single bit stream. Framing on the "101" marker bits relates to the establishment of the two-frame parity interval, and the establishment of the superframe for the purpose of demultiplexing synchronization information.

It is to be understood that the embodiment described herein is merely illustrative of the principles of the invention. Various modifications thereto may be effected by persons skilled in the art without departing from the spirit and scope of the invention. For example, one terminal control bit need not be in the adjacent digit space with respect to the other terminal control bit of the pair. The terminal bits of the complementary or equal pair may be separated by a predetermined number of even bit positions.

We claim:

1. Apparatus for combining a plurality of input data bit streams into a single output bit stream comprising:

means for generating a control bit of a first type in response to a first characteristic of said input data bit streams;

means for generating a control bit of a second type in response to a second characteristic of said input data bit streams; and means for interleaving the data bits from said plurality of input data bit streams with said control bitis of said first and second types to produce sequential frame intervals of bits, each one of said frame intervals having a complementary pair of control bits of said first type and an equal pair of control bits of said second type at predetermined points within said frame interval.

2. Apparatus for combining a plurality of input data bit streams as defined in claim 1 wherein the input data bit streams are asynchronous and the means for generating one type of control bit includes a synchronizer circuit for each of said plurality of input data bit streams for developing a stuff request signal in response to the rate of its corresponding data bit stream, and means for generating sequential values of said one type of control bit in response to the stuff request signals from the synchronizer circuits.

3. Apparatus for combining a plurality of input data bit streams as defined in claim 1 wherein said means for generating a control bit of one type includes at least one parity counter circuit for developing a digital value which indicates the number of digital "1s" in a predetermined number of said frame intervals, and a generating means for developing either a digital "1" or "0" as said one type of control bit in response to whether the digital value developed by said counting circuit is odd or even.

4. Apparatus for combining a plurality of input data bit streams into a single output bit stream comprising:

means for generating a first control bit and its complement in response to a first characteristic of said input data bit streams;

means for generating a second control bit in response to a second characteristic of said input data bit streams;

a first multiplex circuit for combining the data bits from selected input data streams with a first and second control bit;

a second multiplex circuit for combining the data bits from the remaining input data bit streams with the complement of said first control bit and said second control bit; and means for interleaving the outputs of said first and second multiplex circuits to produce sequential frame intervals of bits, each one of said frame intervals having a complementary pair of the first control bits and an equal pair of the second control bits at predetermined points within the frame interval.

5. Apparatus for combining a plurality of input data bit streams as defined in claim 4 wherein the means for generating a first or second control bit includes a plurality of synchronizer circuits, one for each of said input data bit streams, each one of said plurality of synchronizer circuits being responsive to both the rate of its corresponding input data bit stream and to the rate of said output bit stream for developing a stuff request signal in response to a predetermined threshold level, and means for developing digital values for said first or second control bit in response to a sequential sampling of the stuff request signals from said plurality of synchronizer circuits.

6. Apparatus for combining a plurality of input data bit streams as defined in claim 4 wherein the means for generating a first or second control bit includes a first parity counting means responsive to the output of said first multiplex circuit, a second parity counting means responsive to the output of said second multiplex circuit, and means responsive to values developed by said first and second counting means to develop digital values for said first or second control bit.

7. Apparatus for combining a plurality of input data bit streams as defined in claim 4 wherein said first multiplex circuit includes a modulo 2 adder circuit at its output, said second multiplex circuit includes a modulo 2 adder circuit at its output, and the apparatus further includes a pseudo random word generating means for providing a pseudo random word at one input of said first modulo 2 adder circuit and a complement of the pseudo random word at one input of said second modulo 2 adder circuit.

8. In a multichannel digital multiplexing apparatus, a multiplexing circuit for combining the data bits from a plurality of incoming data channels into frames of successive binary groups, each of said groups having a data bit from each one of said plurality of incoming data channels, means for adding two pairs of nondata digit spaces to each frame exclusive of said data spaces, means for generating a first nondata bit and its complement in response to a first characteristic of the data bits from said plurality of incoming data channels, means for generating a second nondata bit in response to a second characteristic of said data bits, from said plurality of incoming data channels, and means for coupling said first nondata bit and its complement into one of said two pairs of nondata digit spaces, and means for coupling said second nondata bit into the other one of said two pairs of nondata digit spaces.

9. In a multichannel digital multiplexing apparatus as defined in claim 8 wherein said multiplexing circuit includes a first multiplexing means for combining the data bits from selected ones of said plurality of incoming data channels and a second multiplexing means for combining the data bits from the other ones of said plurality of incoming data channels.

10. In a multichannel digital multiplexing apparatus as defined in claim 8 wherein said incoming data channels are asynchronous and said means for generating either said first or second nondata bit includes a plurality of synchronizer means, one for each of said incoming data channels, each one of said plurality of synchronizer means develops a stuff request signal in response to the bit rate in its corresponding incoming data channel, and means for generating digital values for the corresponding nondata bit in response to a sequential sampling of the stuff request signals from said plurality of synchronizer means.

11. In a multichannel digital multiplexing apparatus as defined in claim 8 wherein said means for generating either said first or second nondata bit includes at least one counting means for developing a digital value indicative of the number of logical "1s" in a predetermined number of said frames of successive binary groups, and means for generating a digital value for the corresponding nondata bit in response to the digital value developed by said counting means.

12. In a multichannel digital multiplexing apparatus, a first multiplexing circuit for combining data bits from selected ones of a plurality of incoming data channels into frames of successive binary digits, a second multiplexing circuit for combining the data bits from the other ones of said plurality of incoming data channels into frames of successive binary digits, each one of said frames having at least one nondata digit space at the beginning of said frame and one nondata digit space within the frame, means for generating a first nondata bit and its complement in response to a first characteristic of the data bits from said plurality of incoming data channels, means for generating a second nondata bit in response to a second characteristic of the data bits from said plurality of incoming data channels, means for coupling said first and second nondata bits into the two nondata digit spaces of each one of said frames developed by said first multiplexing circuit, and means for coupling the complement of said first nondata bit and said second nondata bit into the nondata digit spaces of each one of the frames developed by said second multiplexing circuit, and means for combining the binary digits developed by said first multiplexing circuit with the binary digits developed by said second multiplexing circuit into a combining output bit stream having frame intervals which includes a complementary pair of first nondata bits and an equal pair of second nondata bits.

13. In a multichannel digital multiplexing apparatus as defined in claim 12 wherein the plurality of incoming data channels are asynchronous and said means for generating either said first nondata bit or said second nondata bit includes a plurality of synchronizer means, each one of which is associated with one of said plurality of incoming data channels to develop a stuff request signal in response to a condition in the corresponding synchronizer means that indicates a number of bits in storage is below a predetermined threshold level, and means for generating a sequence of digital values for the corresponding nondata bit in response to a sequential sampling of the stuff request signals from said plurality of synchronizer means.

14. In a multichannel digital multiplexing apparatus as defined in claim 12 wherein said means for generating either said first nondata bit or said second nondata bit includes a first counting means for developing a digital value which indicates the number of logical "1s" in a predetermined number of frames of successive binary digits developed by said first multiplexing circuit, a second counting means for developing a digital value which indicates the number of logical "1s" in a predetermined number of frames of successive binary digits developed by said second multiplexing circuit, and a generating means foro developing sequential digital values for the corresponding nondata bit in response to the digital values developed by said first and second counting means.

15. In a multichannel digital multiplexing apparatus as defined in claim 12 wherein said first multiplexing circuit includes a first modulo 2 adder means at its output, and said second multiplexing circuit includes a second modulo 2 adder means at its output, and the multiplexing apparatus further includes a pseudo random word generating means for providing a pseudo random word to one input of said first modulo 2 adder means and a complementary pseudo random word to said second modulo 2 adder means.

* * * * *

UNITED STATES PATENT AND TRADEMARK OFFICE

CERTIFICATE OF CORRECTION

PATENT NO. : 3,872,257

DATED : March 18, 1975

INVENTOR(S) : Werner Heinrich Bleickardt and Richard Barker Robrock, II

It is certified that error appears in the above-identified patent and that said Letters Patent are hereby corrected as shown below:

Column 2, line 12, "controls" should read --control--.

Column 4, line 45, "but" should read --bus--.

Column 6, line 59, "IV" should read --VI--;
line 61, "operted" should read --operated--.

Column 7, line 51, "drame" should read --frame--.

Column 9, line 47, "Ci2" should read --$C_{i2}$--.

Column 10, line 41, "providing" should read --provided--.

Column 11, line 1, after "one" and before "position", insert --bit--.

Column 12, line 16, after "terminal" and before "bits", insert --control--;
line 30, "bitis" should read --bits--;
line 67, after "data" and before "streams", insert --bit--.

Column 14, line 47, "combining" should read --combined--.

Column 15, line 8, "foro" should read --for--.

Signed and Sealed this

*fourteenth* Day of *October 1975*

[SEAL]

*Attest:*

RUTH C. MASON
*Attesting Officer*

C. MARSHALL DANN
*Commissioner of Patents and Trademarks*